United States Patent [19]

Timmons et al.

[11] 3,879,324
[45] Apr. 22, 1975

[54] SOLVENT-FREE, AQUEOUS RESIN DISPERSION

[76] Inventors: Robert D. Timmons, R.R. No. 2 Box 128 - 179th St., Tinley Park, Ill. 60477; Anthony J. Castro, 127 South Cruyler, Oak Park, Ill. 60302

[22] Filed: Apr. 29, 1958

[21] Appl. No.: 725,128

[52] U.S. Cl. .................... 260/29.2 EP; 260/29.2 N; 260/29.6 MN 260/29.6 PM
[51] Int. Cl. .................................. C08g 51/24
[58] Field of Search . 260/29.6 PM, 29.2 N, 29.2 EP

[56] References Cited
UNITED STATES PATENTS

| | | | |
|---|---|---|---|
| 1,836,021 | 12/1931 | Gibbons | 260/29.6 |
| 2,051,409 | 8/1936 | Kenney | 260/29.6 |
| 2,161,481 | 6/1939 | Marks | 260/93.5 W |
| 2,296,403 | 9/1942 | Renfrew et al. | 260/93.5 W |
| 2,427,532 | 8/1947 | Miskel | 260/29.6 |
| 2,809,948 | 10/1957 | Hunter et al. | 260/29.6 |
| 2,811,459 | 10/1957 | Wittcoff | 260/29.7 |
| 2,824,848 | 2/1958 | Wittcoff | 260/29.2 N |
| 2,951,054 | 8/1960 | Hess | 260/29.2 |
| 2,988,527 | 6/1961 | Tegge | 260/29.6 |
| 3,168,488 | 2/1965 | Sommer | 260/29.2 |
| 3,249,412 | 5/1966 | Kolek et al. | 260/29.2 |
| 3,301,804 | 1/1967 | Zora et al. | 260/29.2 |
| 3,320,215 | 5/1967 | Conte et al. | 260/29.2 |
| 3,355,409 | 11/1967 | Bissot | 260/29.2 |
| 3,422,049 | 1/1969 | McClain | 260/29.6 |
| 3,432,483 | 3/1969 | Peoples et al. | 260/29.6 EME |
| 3,446,782 | 5/1969 | Okazaki et al. | 260/29.2 |

OTHER PUBLICATIONS

Travis "Mechano Chemistry and the Colloid Mill" 1928 Pages 148, 149, 154-7, 162 and 163.

*Primary Examiner*—John C. Bleutge
*Assistant Examiner*—Arthur H. Koeckert
*Attorney, Agent, or Firm*—Francis W. Young; Jack H. Hall; Philip M. Pippenger

[57] ABSTRACT

Solvent free stable aqueous dispersions of synthetic resins having particle size of less than about 10 microns formed through use of cationic, anionic and nonionic dispersing agents and process therefor. The stable aqueous resin dispersions are useful as coatings, in paints, textile treating and the like.

4 Claims, No Drawings

SOLVENT-FREE, AQUEOUS RESIN DISPERSION

BACKGROUND OF THE INVENTION

Many synthetic resins which may be formed by emulsion polymerization are well known in the art. It is not difficult to form stable aqueous dispersions of such resins by addition of the resin and an appropriate dispersing agent to water with stirring. However, a large group of synthetic resins cannot be produced by free radical polymerization techniques, and therefore, the bulk polymer must be dispersed in water to obtain an aqueous dispersion. Prior to this invention, dispersions of bulk polymers in water have been obtained, but such dispersions have been found to be quite unstable, separating in as short a time as from a few hours to a few days. The dispersions of bulk polymers prior to this invention have also exhibited poor film forming properties. Both of these undesirable properties are largely due to the large particle size of the resin. The particle size of the resins in the previously formed dispersions of bulk polymers have been in the order of 50 microns and larger.

It is highly desirable to provide solvent free stable aqueous dispersions of synthetic resins such as alpha-substituted styrene resins, epoxy resins, and polyamides. These resins cannot be produced by free radical polymerization techniques. For many use applications, it is highly desirable to provide stable aqueous dispersions of such resins to obviate the disadvantages encountered with use of organic solvents and heat. Such aqueous synthetic resin dispersions find wide use as paper coatings, paper and board sizings, protective coatings, extenders for various paint emulsions, textile treatments, and carpet backings. In many of these applications, a rapid depositing quick water resistant product is desired.

It is an object of our invention to provide organic solvent free stable aqueous dispersions of synthetic resins having particle size of less than about 10 microns using cationic, anionic and nonionic dispersing agents.

It is another object of our invention to provide a process for production of solvent free stable aqueous dispersions of alpha-substituted styrene, epoxy and polyamide resins.

It is a still further object of our invention to provide stable aqueous dispersions of alpha-substituted styrene, epoxy and polyamide resins which possess shelf lives in excess of six months and may contain up to about 75 weight percent solids.

Still another object is to provide aqueous resin dispersions having good film forming properties.

A further object of our invention is to provide aqueous resin dispersions of bulk synthetic resin polymers wherein the major fraction of particles will range in size from about 1 to 5 microns.

Our invention affords the attainment of these and other objects which will become apparent in the following description and specific examples.

By the term dispersion, we mean to include all multiple phase apparently homogeneous mixtures of microscopically hetergeneous finely divided phases.

The formation of the dispersions of our invention is achieved by dispersing a resin in liquid phase in a continuous aqueous liquid phase, with a dispersing agent. At this stage of liquid in liquid phase dispersion, the system is commonly referred to as a liquid-liquid emulsion. When the liquid-liquid dispersion is cooled to ambient temperature, the resin phase solidifies forming a dispersion of solid resin particles in a continuous aqueous phase. Although some products are generally sold in the resin industry as "resin emulsions," it is recognized that such products are actually dispersions of solid resin in a continuous aqueous phase.

Synthetic resins useful in the storage stable organic solvent free aqueous dispersions of our invention include those selected from the group consisting of alphasubstituted styrene, epoxy and polyamide resins.

Especially suitable alpha-substituted styrenes include alpha-chloro-styrene and alpha-alkyl-substituted styrenes wherein the alkyl group has from 1 to 22 carbon atoms. Particularly suitable for use in our invention is alpha-methyl styrene. Alpha-ethyl styrene also produces excellent aqueous emulsions according to our invention.

Epoxy resins suitable for use in this invention are complex polymeric reaction products of polyhydric phenols with polyfunctional halohydrins and/or glycerol dichlorohydrin. An important class of epoxy resins is obtained by reacting trimethanol propane or glycerin with epichlorohydrin. Typical polyhydric phenols used in the preparation of epoxy resins include resorcinol and various bisphenols resulting from the condensation of phenol with aldehydes or ketones such as formaldehyde, acetaldehyde, acetone, methyl ethyl ketone and the like. One of the more typical epoxy resins is the reaction product of epichlorohydrin and 2,2-bis(p-hydroxyphenyl)-propane (Bisphenol A). Also, suitable epoxy resins may be prepared as the reaction products of epichlorohydrin and bis(tetra-hydroxyphenol)-sulfone. The glycidyl esters of polymeric fatty acids obtained by reacting the fatty acids having from 8 to 22 carbon atoms with epichlorohydin are also commercially available and are suitable epoxide materials. Another subclass of suitable epoxy resins are Novolac resins produced by condensing phenol and an aldehyde in the presence of an acid catalyst and subjected to condensation reaction with epichlorohydrin.

Suitable epoxy resins for use in this invention are defined by having epoxy equivalent weights of about 100 to 2000 and preferably from about 120 to about 650, expressed in terms of grams of compound per epoxy group. It is recognized that the above epoxy equivalent weights include both resins which are liquid and resins which are solid at ambient temperatures. The most useful liquid epoxy resins are those having epoxy equivalent weights of from about 185 to 195, for example, the reaction product of epichlorohydrin and Bisphenol A. Useful solid epoxy resins preferably have an epoxy equivalent weight of from about 450 to 530. Especially preferred as an epoxy component is the reaction product of epichlorohydrin and Bisphenol A having an epoxy equivalent weight of from about 450 to 530.

Polyamides suitable for use in this invention include both reactive and non-reactive type polyamide resins. Non-reactive polyamide resins are well known in the art are those which do not have reactive amino or carboxy functional groups. Non-reactive polyamides include diamine-diacid condensation products and the condensation products of monoaminomonocarboxylic acids or derivatives thereof. Specific illustrations are the condensation products of 6-aminohexanoic acid, 7-amino-heptanoic acid, 8-aminooctanoic acid, 11-aminoundecanoic acid, and their amide, ester and lactam derivatives such as 2-oxo-pentamethylenimines 2-oxo-hexamethylenimine, 2-oxo-heptamethylenimine, 2-oxo-octamethylenimine and 2-oxo-decamethylenimine. These polyamides are thermoplastic poly-carbonamide linear polyamides.

Also included are the condensation products of dicarboxylic acids such as adipic, suberic, sebasic, isophthalic, terephthalic, hexahydroterephthalic, with any of the diamines of tetramethylene, pentamethylene, hexamethylene, octamethylene, decamethylene, p-xlidine, m-xylidine, p-phenylene, m-phenylene, benzidine, and piperazine. p-xylidine.

Reactive reactive are well known in the art as those having reaction amino functions. Such compounds are formed by reaction of carboxylic acids with a stoichiometric excess of amine. Typically, these resins have amine values from about 5 to 200. The amine value is defined as the miligrams of KOH which are equivalent to 1 gram of resin. Reactive polyamides may be prepared by reacting amines such as diethyl triamine, triethylene tetramine and tetraethylene pentamine with poly-carboxylic acids. Typical aliphatic acids include glutaric, adipic and sebacic, and typical aromatic acids include terephthalic and isophthalic. Also suitable acid reactants include dimeric and higher polymeric fatty acids such as derived from natural oils including linseed oil, soybean oil tall oil and safflower oil.

We have found that cationic, anionic and nonionic dispersing agents can be used to form the dispersions of our invention. We prefer to use a cationic dispersing agent to provide a faster rate of deposition and faster water resistance of the polymer coating.

Suitable cationic dispersing agents include N-normal alkyl, N-normal alkenyl, N-secondary-alkyl, and N-secalkyl(c diamines having from 8 to 22 carbon atoms in the alkyl group and having the nitrogen atoms connected by an alkylene group having from 2 to 6 carbon atoms. Preferred are N-normal-alkyl and N-secondary-alkyl trimethylene diamine compounds. Also suitable are alkoxylated derivatives of the above diamine compounds, especially ethoxylated and propoxylated adducts of from about 1 to 25 moles of alkylene oxide per mole of diamine. The diamine is preferably used in its salt form, especially those salts formed with inorganic and shorter chain organic acids such as hydrochloride, acetates, etc. Specific diamine compounds include N-cocotrimethylene diamine, N-oleyl-trimethylene diamine, N-tallow-trimethylene diamine, N-soya-trimethylene diamine, N-sec-alkyl($C_{7-9}$)trimethylene diamine, N-sec-alkyl($C_{11-14}$)trimethylene diamine, N-sec-alkyl($C_{15-20}$)trimethylene diamine, N-9(10)phenylstearyltrimethylene diamine, N-9(10)naphthylstearyltrimethylene diamine, the ethoxylated and propoxylated derivatives of the above listed diamines, and salts, especially hydrochloride and acetate salts of the above listed diamines.

Also, suitable are quaternary ammonium compounds having a long chain aliphatic radical of from about 8 to 22 carbon atoms including N-normal-alkyl, N-normal-alkenyl, N-secondary-alkyl and N-arylalkyl. Specific quaternary ammonium compounds include cocotrimethyl quaternary ammonium chloride, oleyltrimethyl quaternary ammonium chloride, tallow trimethyl quaternary ammonium chloride, soyatrimethyl quaternary ammonium chloride, N-sec-alkyl($C_{7-9}$) trimethyl quaternary ammonium chloride, N-sec-alkyl($C_{11-14}$) trimethyl quaternary ammonium chloride, N-sec-alkyl($C_{15-20}$) trimethyl quaternary ammonium chloride, N-9(10)phenylstearyl trimethyl quaternary ammonium chloride, N-9(10)naphthylstearyl trimethyl quaternary ammonium chloride, and the ethoxylated and propoxylated derivatives of the above listed quaternary ammonium chlorides.

Also suitable are diquaternary ammonium compounds including those formed from the above-mentioned diamines. Especially preferred is N-9(10)phenylstearyl-N,N,N',N',N'-pentamethyl trimethylene diquaternary ammonium dichloride.

Another group of cationic dispersion agents suitable in our invention are imidazolines having the formula

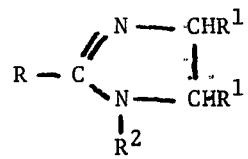

wherein R is an aliphatic hydrocarbon radical containing from 4 to 22 carbon atoms, each $R^1$ is a member selected from the group consisting of hydrogen, hydroxyl and lower alkyl, $R^2$ is a member selected from the group consisting of hydrogen, lower alkyl and radicals having the formula $(CH_2)_xOH$ in which x is an integer from 2 to 6. The radical R may be a saturated, unsaturated or aryl substituted straight chain or branched aliphatic hydrocarbon radical such as derived from a fatty acid such as, for example, caproyl, octanyl, decanyl, lauryl, palmityl, stearyl, oleyl, linoleyl, linolenyl and 9(10)phenylstearic acid or a branched chain synthetic acid as derived by carboxylation of olefins. The process disclosed in such branched chain acids may be produced according to copending U.S. Pat. application, Ser. No. 450,836 filed Apr. 26, 1965. The $R^1$ groups may be, for example, methyl, ethyl, propyl, hexyl, as well as hydrogen and hydroxyl. Each $R^2$ group may be, for example, methyl, ethyl, butyl, hexyl, 2-hydroxyethyl, 4-hydroxybutyl, 5-hydroxypentyl and 6-hydroxyhexyl. The imidazolines which may be used in the practice of this invention may be obtained by dehydrating fatty acid amides of ethylene diamine or its N-substituted products, by heating ethylene diamine or one of its N-substituted products, such as 2-hydroxyethyl ethylene diamine, 2-hydroxyisopropyl ethylene diamine with free fatty acids, such as lauric, palmitic, oleic, linoleic, ricinoleic, and stearic, or the corresponding amides or esters, under such conditions as to effect the splitting out of water.

Amides having the formula

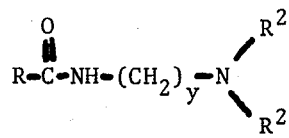

wherein y is an integer from 1 to 6 and R and $R^2$ are as defined above, are suitable cationic dispersing agents.

Anionic dispersion agents are well known in the art and one subclass preferred for use in our invention includes the alkyl metal salts and alkali metal salts of carboxylic acids. The alkyl group of the sulfonates may range from 6 to 22 carbon atoms. Especially suitable sulfonates include sodium lauryl sulfonate, sodium octadecyl sulfonate, and potassium lauryl sulfonate. The alkali metal salts of carboxylic acids include non-carboxylic acids having from 6 to 22 carbon atoms, more specifically, including sodium stearate, potassium oleate, sodium laurate, and potassium palmitate.

Nonionic dispersion agents are well known in the art and one subclass useful in our invention includes alkoxylated aliphatic alcohols, including ethoxylated and propoxylated aliphatic alcohols having from 2 to 10 carbon atoms, including ethoxylated mono-glyceride, diglycerides, ethoxylated sorbitol and propoxylated mannose.

The stable aqueous dispersions of synthetic resins of our invention comprise from about 0.25 to 75 weight percent resin, based upon the total composition, having particle size of less than about 10 microns, selected from the group consisting of alpha-substituted styrene, epoxy and polyamide resins, from about 0.2 to 10 weight percent dispersing agent selected from the group consisting of cationic, anionic and nonionic dispersing agents, and from about 15 to 99 weight percent water. Dispersions of synthetic resins containing from about 40 to 65 weight percent resin have been found to be preferred for many uses.

The exceptionally high solids content of the dispersions according to our invention is surprising and renders such dispersions especially useful in coating applications where high solids content, organic solvent free systems offer unique advantages. Concentrates containing a high solids content may be prepared and then diluted with water to provide systems having low solids content for sizing, and the like.

The amount of dispersing agent required varies with the particular dispersing agent utilized, with from about 0.2 to 5 weight percent preferred when using cationic dispersing agents selected from the group consisting of amino and quaternary ammonium compounds having a hydrocarbon group of from 8 to 22 carbon atoms.

Any non-reactive additives may be used in the dispersions of this invention, for example, pigments, dyes, organic solvents, leveling agents, and silicone oils. Water soluble ammonium, alkali metal such as lithium, sodium or potassium, and alkaline earth metal such as magnesium, borium, or calcium salts such as fluoride, chloride, bromide, iodide, thiocyanate, sulfate, acetate, propionate, benzoate, lactate, citrate and sulfonate may be added as stabilizers in the same fashion as they are used in bituminous aqueous emulsions. Preferably the salts such as calcium chloride are added in from about 0.05 to 0.5 weight percent to aid in the stabilization of the dispersions.

The process of our invention briefly comprises heating resin selected from the group of alpha-substituted styrene, epoxy and polyamide resins to above 75°F in excess of the ring and ball softening point, mixing from about 0.25 to 75 weight percent resin, based upon total composition at said temperature, about 0.2 to 10 weight percent dispersing agent selected from cationic, anionic and nonionic dispersing agents, and about 15 to 99 weight percent water at from about 120° to 160°F, through a colloid mill with head clearance from about 0.005 to 0.012 inches, about 5 to 30 psig head pressure and about 5 to 15 psig back pressure, and then cooling the product to below the boiling point of water.

The dispersions of our invention may be formulated by heating the resin to about 75°F in excess of the ring and ball softening point of the resin to provide a fluid synthetic resin. Generally, the synthetic resins utilized in our invention are heated to from about 225° to 400°F. It should be noted that in all cases resins are heated to above the boiling point of water. The water phase is heated separately to from about 120° to 160°F. The emulsifying agent may be added to the aqueous phase or to both the aqueous phase resin phase. It is preferred to add from 60 to 85 percent of the dispersing agent to the aqueous phase and from 15 to 40 weight percent of the dispersing agent to the resin phase. The resin phase and aqueous phase are fed in separate portions into a colloid mill such as a Charlotte Chemi-Colloid Mill. To achieve the small resin particle size of our dispersions, the colloid mill head clearance is from about 0.005 to 0.012 inches. The colloid mill is operated at from about 5 to 30 psig head pressure and from about 5 to 15 psig back pressure. The product of the colloid mill is discharged into any suitable heat exchanger to rapidly decrease the temperature of the product to below the boiling point of water and preferably below 100°F.

Resulting dispersions are found to be extremely stable and have relatively uniform particles of resin in the aqueous phase. Upon microscopic examination, the particle sizes are observed to be relatively uniform and generally in the size of about 1 to 5 microns. Such solvent free stable aqueous dispersions of synthetic resins have been found to be storage stable for several months and exhibit excellent film forming properties.

The following examples are presented to illustrate the present invention.

EXAMPLE I

A resin phase of alpha-methyl styrene was prepared by heating a mixture of 60 weight percent alphamethyl styrene homo-polymer having a softening point of 235° to 266°F and molecular weight of 750 (Amoco 18–240; sold by Amoco Chemicals Corporation) and 40 weight percent alpha-methyl styrene homo-polymer liquid at 70°F having molecular weight of (Amoco AMS-10 polymer sold by Amoco Chemicals Corporation) to about 350°F. An aqueous phase was prepared by addition (amounts based upon total final composition) of 0.5 weight percent N-tallow trimethylene diamine, 0.1 weight percent $CaCl_2$ and 0.25 weight percent HCl to the water and heating to about 150°F. The resin phase and aqueous phase were combined at the above temperatures in a ratio of 60 weight percent resin phase and 40 weight percent aqueous phase through a Charlotte Chemi-Colloid Mill. The colloid mill was set to 0.012 inches head clearance and operated at 10 psig head pressure and 5 psig back pressure. The product from the colloid mill was passed into a heat exchanger to reduce the temperature of the product to about 125°F. The resulting product was a very stable dispersion of fine particles of alpha-methyl styrene resin in the aqueous phase. Upon microscopic examination, the particle size was observed to be in the range of 5 microns. The aqueous resin dispersion was stable for several months and exhibited excellent film forming properties.

EXAMPLE II

Aqueous resin dispersions were prepared according to the method described in Example I using the same resin phase as described in Example I, but using the following dispersing agents in the aqueous phase in place of the N-tallow trimethylene diamine used in Example I:

N-tall oil trimethylene diamine (derived from tall oil fatty acids containing principally about equal mixtures of oleic and linoleic components)

N-sec-alkyl($C_{15-20}$)trimethylene diamine

N-9(10)-phenylstearyl trimethylene diamine

N-9(10)-phenylstearyl-N,N,N',N',N'-pentamethyl trimethylene diamine

All of the aqueous resin dispersions formed excellent film forming properties and exhibited excellent stability.

EXAMPLE III

Aqueous resin dispersions were prepared in the same manner as Example II omitting the HCl and using the following dispersing agents:

N-tallow-N,N,N-trimethylene quaternary ammonium chloride

N-sec-alkyl($C_{15-20}$)N,N,N-trimethylene quaternary ammonium chloride

N-tallow-N,N,N',N',N'-pentamethyl trimethylene diquaternary ammonium dichloride

N-sec-alkyl($C_{15-20}$)N,N,N',N',N'-pentamethyl trimethylene diquaternary ammonium dichloride All of the aqueous resin dispersions exhibited excellent film forming properties and stability.

EXAMPLE IV

A resin phase of alpha-methyl styrene was prepared by heating a mixture of 70 weight percent Amoco 18–240 and 30 weight percent Amoco AMS–10 and 0.5 weight percent, based upon the total final dispersion composition, N-tall oil trimethylene diamine. An aqueous phase was prepared by addition of 0.75 weight percent N-tall oil trimethylene diamine and 0.60 weight percent hydrochloric acid, both based upon the total resin dispersion, to the water and heating to about 160°F. 60 weight percent resin phase and 40 weight percent aqueous phase are fed at the above temperatures through a Charlotte Chemi-Colloid Mill. The mill is set to 0.008 inches head clearance and operated at 10 psig head pressure and 20 psig back pressure. The product from the colloid mill is passed into a heat exchanger to reduce the temperature to about 100°F.

EXAMPLE V

A resin phase of alpha-methyl styrene is prepared by heating 80 weight percent Amoco 18–240, 20 weight percent Amoco AMS–10 and 0.5 weight percent, based upon total aqueous resin dispersion, N-9(10)phenylstearyl trimethylene diamine to about 350°F. An aqueous phase was prepared by addition of 0.75 weight percent N-tall oil trimethylene diamine and 0.60 weight percent hydrochloric acid, both weights based upon the total final dispersion composition, to water and heating to about 150°F. The resin phase and aqueous phase were combined at a ratio of 60 weight percent resin phase and 40 weight percent aqueous phase through a colloid mill under operating conditions described in Example I. Excellent aqueous resin dispersions exhibiting good film forming properties and stability resulted.

EXAMPLE VI

A resin phase of alpha-methyl styrene is prepared according to the conditions and method described in Example I using 70 weight percent Amoco 18–240, 30 weight percent Amoco AMS–10 and 0.5 weight percent, based upon total aqueous resin dispersion, nonionic dispersing agent of ethoxylated mono-glyceride (as sold by Atlas Chemical Company as Atlas G–1300). An aqueous phase was prepared by addition of 2 weight percent, based upon total aqueous resin dispersion, of Atlas G–1300 to water. The resin phase and aqueous phase were combined at the ratio of 60 to 40 weight percent through a colloid mill under operating conditions described in Example I. Excellent dispersions resulted.

EXAMPLE VII

A resin phase of alpha-methyl styrene is prepared according to the method described in Example I using 70 weight percent Amoco 18–240, 30 weight percent Amoco AMS–10 and 5 weight percent, based upon the total dispersion composition, of a 5°C maximum titer crystalized red oil fatty acid anionic dispersing agent containing primarily unsaturated carboxylic acids having hydrocarbon chains of from $C_{14}$ to $C_{18}$, primarily oleic, and about 7 weight percent saturated acids having chain lengths from $C_{12}$ to $C_{18}$ (sold by Armour Industrial Chemical Company as Neo-Fat 92–04). An aqueous phase was prepared by addition of 3.5 weight percent red oil fatty acid and 1.1 weight percent KOH, both based upon total dispersion composition. The resin phase and aqueous phase is combined in a ratio of 60 weight percent resin and 40 weight percent aqueous phase at elevated temperatures through a colloid mill under conditions and temperatures described in Example I.

EXAMPLE VIII

A resin phase of polyamide resin was prepared by heating the reaction product of dimer acid and diethylene triamine and/or triethylene tetramine having an amine value from 85–95 and viscosity of 7–12 poises at 150°C to 275°F (Pentamid No. 4 sold by Heyden Division, Tenneco Chemicals Institute). An aqueous phase was prepared by adding 5 weight percent, on the basis of the total composition, of N-9(10)phenylstearyl-N,N,N',N',N'-pentamethyl trimethylene diquaternary ammonium dichloride and heating to 150°F. The resin and aqueous phases were mixed through a Charlotte Chemi-Colloid Mill at a ratio of 45 to 55 % and at the above temperatures. The mill head clearance is set at 0.010 inch and head pressure is 10 to 30 psig and back pressure is 7 to 13 psig. The product is cooled to 100° to 125°F. A very satisfactory organic solvent free stable aqueous polyamide dispersion was obtained suitable as a coating composition, adhesive or caulking compound.

EXAMPLE IX

Aqueous resin dispersions are prepared according to the method described in Example VIII using the same resin phase as described in Example VIII and using the following dispersing agents in place of the N-9(10)phenylstearyl-N,N,N',N',N'-pentamethyl trimethylene diquaternary ammonium dichloride using in Example VIII.

N-tallow-N,N,N',N',N'-pentamethyl trimethylene diquaternary ammonium dichloride

N-sec-alkyl($C_{15-20}$)N,N,N',N',N'-pentamethyl trimethylene diquaternary ammonium dichloride Hydrochloride salt of N-9(10)pehnylstearyltrimethylene diamine Dichloride salt of N-tallow N,N,N-trimethylene quaternary ammonium chloride 2-phenyl heptadecyl imadazoline Excellent dispersions result with each dispersion agent exhibiting good stability with time.

EXAMPLE X

A resin phase is prepared using an epoxy resin produced by reaction of Bisphenol A and epichlorohydrin having an epoxy equivalent weight of 450–540, melting point 65°–75°C and density 9.9 pounds per gallon (Epoxy 7071 sold by Ciba Products Company). The resin phase is heated to from 325° to 340°F. A water phase to which is added 2 weight percent N-tallow-N,N,N',N',N'-pentamethyl trimethylene diquaternary ammonium dichloride, based upon total dispersion, is heated to 135° to 165°F. The resin and water phases at the above temperatures are mixed at a resin to water phase ratio of 60 to 40 weight percent through a colloid mill under operating conditions of Example VIII. The product produced is a stable epoxy resin dispersion useful as an adhesive, sealant and coating.

EXAMPLE XI

An epoxy resin dispersion is prepared as described in Example X using the same resin phase, but using N-tallow-N,N,N-trimethyl quaternary ammonium chloride as the dispersing agent. The dispersing agent is added equally to the resin phase and aqueous phase.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerable without departing from the basic principles of the invention.

We claim:

1. Solvent free stable aqueous dispersions of synthetic resin polymers comprising; from about 0.25 to 75 weight percent resin, based upon the total composition, said resin having particle size of less than about 10 microns and selected from the group consisting of α-substituted styrene resin wherein said substituent is selected from the group consisting of chloro and alkyl having 1 to 22 carbon atoms, epoxy resins having epoxy equivalent weights of about 100 to 2,000 and thermoplastic polycarbonamide linear polyamide resins, provided all said resins are liquid from about 225° to about 400° F.; from about 0.2 to 5 weight percent of a cationic amino dispersing agent having a hydrocarbon group of from about 8 to 22 carbon atoms; and about 15 to 99 weight percent water.

2. Dispersions of claim 1 wherein said dispersing agent is a diamine wherein said hydrocarbon group is selected from the group consisting of normal-alkyl, normal-alkenyl, sec-alkyl, and arylalkyl.

3. Solvent free stable aqueous dispersions of bulk synthetic resin polymers comprising; from about 0.25 to 75 weight percent resin, based upon the total compositions, said resin having particle size of less than about 10 microns and selected from the group consisting of α-substituted styrene resin wherein said substituent is selected from the group consisting of chloro and alkyl having 1 to 22 carbon atoms, epoxy resins having epoxy equivalent weights of about 100 to 2,000 and thermoplastic polycarbonamide linear polyamide resins, provided all said resins are liquid from about 225° to about 400° F.; from about 0.2 to 5 weight percent of a cationic quaternary ammonium dispersing agent having a hydrocarbon group of from about 8 to 22 carbon atoms; and about 15 to 99 weight percent water.

4. Dispersions as in claim 3 wherein said quaternary dispersing agent is selected from the group consisting of mono and di-quaternary ammonium compounds wherein said hydrocarbon group is selected from the group consisting of normal-alkyl, normal-alkenyl, sec-alkyl, and arylalkyl.

* * * * *